United States Patent [19]

Lukemire

[11] Patent Number: 5,418,709

[45] Date of Patent: May 23, 1995

[54] FORBACK DC-TO-DC CONVERTER

[75] Inventor: Alan T. Lukemire, Crofton, Md.

[73] Assignee: The United States of America as represented by the Administrator of the National Aeronautics and Space Administration, Washington, D.C.

[21] Appl. No.: 38,746

[22] Filed: Mar. 24, 1993

[51] Int. Cl.[6] ...................... G05F 1/613; H02M 3/335
[52] U.S. Cl. .................................. 323/222; 323/282; 323/285; 363/21; 363/97
[58] Field of Search ..................... 323/220, 282, 285; 363/16, 20, 21, 97, 131

[56] References Cited

U.S. PATENT DOCUMENTS

| 3,573,598 | 4/1971 | Clarke et al. | 363/27 |
|---|---|---|---|
| 4,184,197 | 7/1980 | Cuk et al. | 363/16 |
| 4,257,087 | 3/1981 | Cuk | 363/16 |
| 4,301,497 | 11/1981 | Johari | 363/21 |
| 4,355,352 | 10/1982 | Bloom et al. | 363/16 |
| 4,415,959 | 11/1983 | Vinciurelli | 363/21 |
| 4,559,590 | 12/1985 | Davidson | 363/21 |
| 4,654,769 | 3/1987 | Middlebrook | 363/16 |
| 4,709,316 | 11/1987 | Ngo et al. | 363/21 |
| 4,734,839 | 5/1988 | Barthold | 363/16 |
| 4,809,149 | 2/1989 | Burghard | 363/20 |
| 4,975,819 | 12/1990 | Lannuzel | 363/16 |
| 5,164,892 | 11/1992 | Kimbara | 363/131 |
| 5,287,261 | 2/1994 | Ehsani | 363/124 |

OTHER PUBLICATIONS

Rudolf P. Severns and Gordon E. Bloom; "Modern DC-to-DC Switchmode Power Conver Circuits"; Published in 1985; pp. 166, 168, and 169, FIG. 7.13.
Alan T. Lukemire; "Forback DC-to-DC Converters"; NASA Tech Brief Published Apr. 1992; pp. 32 and 33, FIGS. 1 and 2.
NASA Technical Support Package; "Forback DC-to-DC Converters" publicly available after publication of reference NASA Tech Brief (see first paragraph on title page); pp. 1 thru 5; Apr. 1992.

Primary Examiner—Jeffrey L. Sterrett
Attorney, Agent, or Firm—Robert D. Marchant; Guy M. Miller

[57] ABSTRACT

A pulse-width modulated DC-to-DC power converter including a first inductor, i.e. a transformer or an equivalent fixed inductor equal to the inductance of the secondary winding of the transformer, coupled across a source of DC input voltage via a transistor switch which is rendered alternately conductive (ON) and non-conductive (OFF) in accordance with a signal from a feedback control circuit. A first capacitor capacitively couples one side of the first inductor to a second inductor which is connected to a second capacitor which is coupled to the other side of the first inductor. A circuit load shunts the second capacitor. A semi-conductor diode is additionally coupled from a common circuit connection between the first capacitor and the second inductor to the other side of the first inductor. A current sense transformer generating a current feedback signal for the switch control circuit is directly coupled in series with the other side of the first inductor so that the first capacitor, the second inductor and the current sense transformer are connected in series through the first inductor. The inductance values of the first and second inductors, moreover, are made identical. Such a converter topology results in a simultaneous volt-second balance in the first inductance and ampere-second balance in the current sense transformer.

12 Claims, 4 Drawing Sheets

FORBACK DC-TO-DC CONVERTER

ORIGIN OF THE INVENTION

This invention was made by an employee of the United States Government and therefore may be made and used by the U.S. Government for governmental purposes without the payment of any royalties thereon or therefor.

BACKGROUND OF THE INVENTION

This invention relates generally to DC-to-DC. converters and more particularly to a pulse-width modulated switching converter.

DC-to-DC power converters utilizing a switching device in a combination of inductors and capacitors to derive power from one source of DC voltage and then deliver that power to a load at the same or a different DC voltage are well known. Many different types of topologies exist for implementing such power converters. The number of different possible combinations using but a relatively few components has resulted in several standard topology types which include, among others, the buck, boost, buck-boost, forward, flyback, and CUK converters. With what initially appears to be only a simple change or a modification in the particular converter implementation, an extremely significant performance variation can result.

While many different topologies could be described, each with its own advantages and disadvantages, the configurations shown in FIGS. 1–3 best represent prior art topologies which exhibit the closest similarity to that of the subject invention to be hereinafter described.

Figure 1:
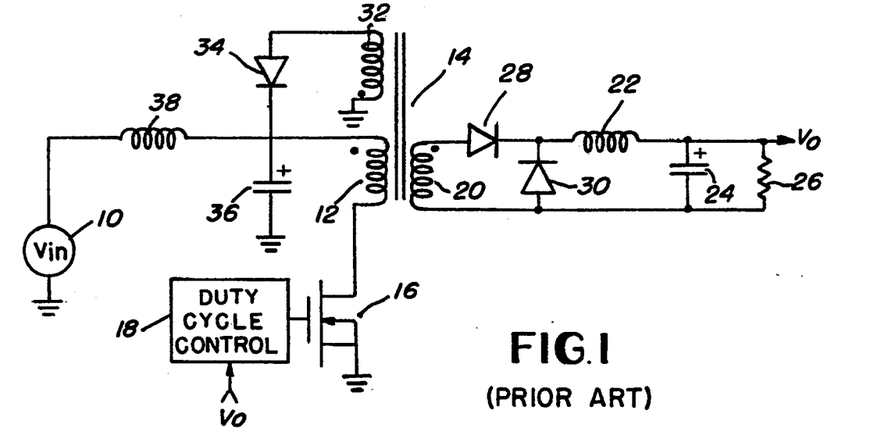
FIG. 1 is an electrical schematic diagram illustrative of a known prior art forward type of converter topology.

FIG. 1, for example, discloses what might be termed a forward converter topology and comprises an isolated or transformer version of a buck converter which, without an input filter, is typically characterized by a converter which displays discontinuous input current while providing a continuous output current. Such an arrangement offers an efficient power conversion technique; however, it almost always requires the use of a reset winding on the power transformer in order to reset the transformer core by returning its stored energy to the primary side. This requirement, while not being difficult to implement, creates some additional design considerations associated with the reset circuitry.

Figure 2:
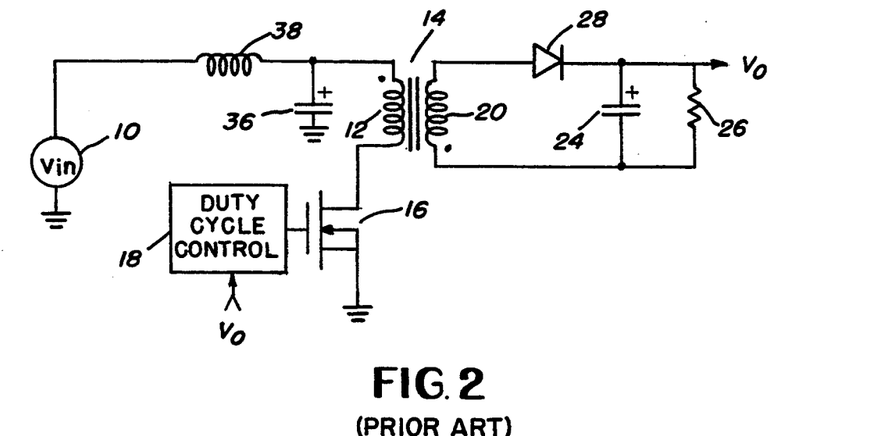
FIG. 2 is an electric schematic diagram illustrative of a flyback type converter topology.

With respect to the circuitry shown in FIG. 2, it exemplifies what is termed flyback converter topology and comprise what might be referred to as an isolated or transformer version of a boost converter which, without an input filter, is characterized by discontinuous input current while also providing discontinuous output current and where the required inductor is incorporated into the transformer which comprises a flyback transformer. It typically offers the smallest number of components for DC-to-DC power conversion.

The third configuration comprises topology which is illustrative of an isolated or transformer version of the CUK converter. An isolated CUK converter utilizes a transformer which is capacitively coupled both on the primary and secondary sides.

While each of the above-referenced power converters as well as other known converter topologies have known utility, inherent limitations and certain disadvantages nevertheless exist.

SUMMARY

Accordingly, it becomes a primary object of this invention to provide an improvement in DC-to-DC power converters.

It is another object of the invention to provide an improvement in pulse-width modulated DC-to-DC power converters.

It is still another object of the invention to provide a pulse-width modulated DC-to-DC power converter having current mode control.

And it is yet another object of the invention to provide a DC-to-DC converter which provides both volt-second balance of the power transformer and ampere-second balance of the current sensing transformer simultaneously.

Briefly, the foregoing and other objects of the invention are achieved by a current-mode controlled pulse-width modulated DC-to-DC power converter including both isolated and non-isolated implementations comprised of a first inductor, i.e. a transformer or an equivalent fixed inductor equal to the inductance of the secondary winding of the transformer, coupled across a source of DC input voltage via a controlled switch device, e.g. a transistor, and which is rendered alternately conductive (ON) and non-conductive (OFF) in accordance with a signal from a feedback control circuit which continuously controls the duty cycle of the transistor switch in relation to a complete cycle of operation. A first capacitor capacitively couples one side of the first inductor to an output filter circuit including a second inductor coupled to a second capacitor which in turn is coupled to the other side of the first inductor, with the circuit load being coupled across the second capacitor. A semiconductor diode is additionally coupled from a common circuit connection between the first capacitor and the second inductor to the other side of the first inductor. A current sense transformer generating a current feedback signal for the switch control circuit is directly coupled in series with the other side of the first inductor so that the first capacitor, the second inductor and the current sense transformer are connected in series through the first inductor. This enables the current of the first and second inductors to be alternately sensed during both portions of an operational cycle. The inductance values of the first and second inductors, moreover, are made identical. The location of the current sense transformer and the use of equal valued first and second inductors result in a relatively simple DC-to-DC converter topology wherein volt-second balance in the first inductor and ampere-second balance in the current sense transformer are achieved simultaneously while at the same time reducing undesired stresses on the switching transistor.

BRIEF DESCRIPTION OF THE DRAWING

The following detailed description of the invention will be more readily understood when considered together with the accompanying drawings wherein.

DETAILED DESCRIPTION OF THE INVENTION PRIOR ART

Before considering the details of the invention, reference will first be made back to the prior art converter topologies referred to above and illustrated in FIGS. 1–3.

As shown in FIG. 1, the isolated forward topology depicted thereat includes a DC voltage input source 10 which applies energy to the primary winding 12 of a power transformer 14 under the control of a transistor switch 16, rendered alternately conductive (ON) and non-conductive (OFF) during each cycle $T_s$ of operation by a feedback control circuit 18 coupled to the primary winding 12 and which controls the ON and OFF time $dT_s$ and $\overline{d}T_s$, respectively, of the transistor 16, where d designates the duty cycle, and accordingly that of the converter itself. The secondary winding 20 couples energy to an inductor-capacitor output filter including an inductor 22 and capacitor 24, with the load comprising a resistance element shown by reference numeral 26 coupled across or shunting capacitor 24.

Furthermore, a diode 28 is connected in series from one (.) polarity end of the secondary winding 20 to the inductor 22, while a second diode 30 shunts both the inductor 22 and the capacitor 24 while being coupled to the other or opposite end of the secondary winding 20 along with the one side of the capacitor 24 and load 26 The primary side of the transformer 14 also includes a reset circuit including a reset winding 32 having its (.) polarity end connected to ground. However, it also requires an additional diode 34 and a capacitor 36 which forms part of an input filter including an inductor 38 connected in series with voltage source 10. The input filter acts to filter out voltage and current noise on the input voltage $V_{in}$, and primarily to filter converter induced current pulses from the DC power source 10.

The forward converter topology illustrated in FIG. 1 offers an efficient power conversion technique; however, it typically requires the use of a reset winding such as the winding 32 to reset the transformer core of the power transformer 14 by returning its stored energy to the primary side. This requirement, although not difficult to implement, causes certain design problems for some applications, such as requiring the additional diode 34 and a relatively large capacitance value for the capacitor 36.

With respect to the flyback topology as depicted in FIG. 2, it intentionally stores energy in the inductance of the power transformer 14 during the on-time interval $dT_s$ of the transistor power switch 16 and then releases the energy to the secondary side of the transformer 14 during its off-time $\overline{d}T_s$ and where for continuous mode operation $dT_s + \overline{d}T_s = T_s$, the time period for one operational cycle. The energy delivered to the load side of the transformer 14 is out of phase with the reenergizing process of the inductance which is incorporated into the transformer 14. If operated in the continuous inductor current mode, this characteristic produces inherent problems in the stability in the duty cycle control circuit 18 which generally results in compromised dynamic performance and when operated in the discontinuous inductor current mode, the switching transistor 16 and the diode 28 can be subjected to undesirable relatively high peak current stresses.

Figure 3:
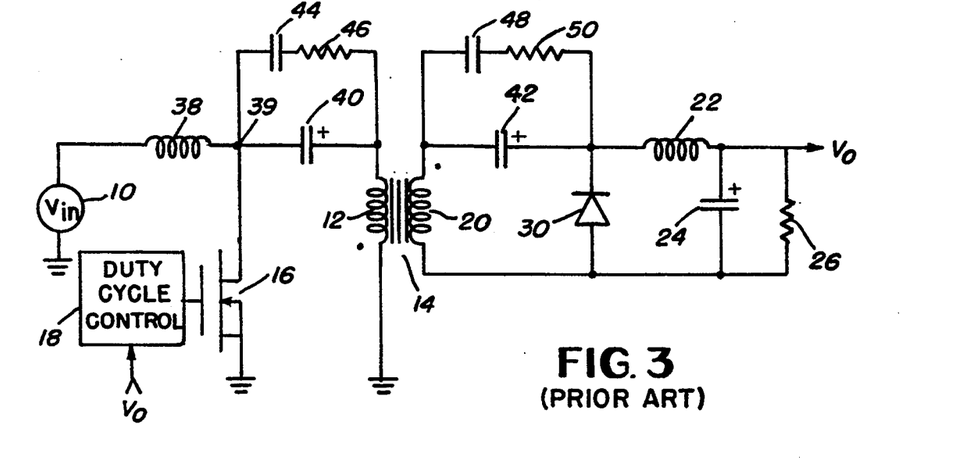
FIG. 3 is an electrical schematic diagram illustrative of an isolated version of a known prior art CUK type converter topology.

As to the CUK topology illustrated in FIG. 3, in addition to capacitively coupling the primary and secondary windings 12 and 20 of the power transformer 14 to their respective input and output circuit components, the grounded capacitor 36 of the forward and flyback topologies (FIGS. 1 and 2) forming part of the input filter is deleted and the control switch device 16 is no longer directly connected to the primary winding 12, but is now connected to a circuit node 39 common to both the inductor 38 and the coupling capacitor 40. Additionally, damping circuits comprised of respective series circuits including capacitor 44, resistor 46 and capacitor 48, resistor 50 must be utilized and shunt the coupling capacitors 40 and 42.

The coupling capacitor arrangement of the CUK topology operates to continuously maintain volt-second balance on the core of the transformer 14 in addition to developing a push-pull driving voltage for improved flux utilization. In so doing, the front end inductor 38 now operates as a current source which drives energy into the transformer 14 and the coupling capacitors 40 and 42. One major disadvantage of the CUK topology, however, is that this current source typically produces voltage spikes across the switching transistor 16, which are often times extremely difficult to reduce. Furthermore, both the switching device 16 and the output diode 30 must carry significantly higher currents than typically encountered in other topologies. The potential voltage and current stresses imposed on both the switching device 16 and the diode 30 force the circuit designer to select components rated for relatively high power levels.

In addition to the potential switching component stresses and other additionally required protection circuitry, not shown, the biggest inherent disadvantage of the CUK topology is the necessary presence of relatively large damping components across both the primary and secondary coupling capacitors 40 and 42 which are shown comprising capacitor 44, resistor 46, and capacitor 48, resistor 50. The damping components are required to shape the AC behavior of the control circuitry 18 being generally large in bulk make size and weight an important and undesirable concern for many applications.

DESCRIPTION OF THE PREFERRED EMBODIMENTS

Figure 4:
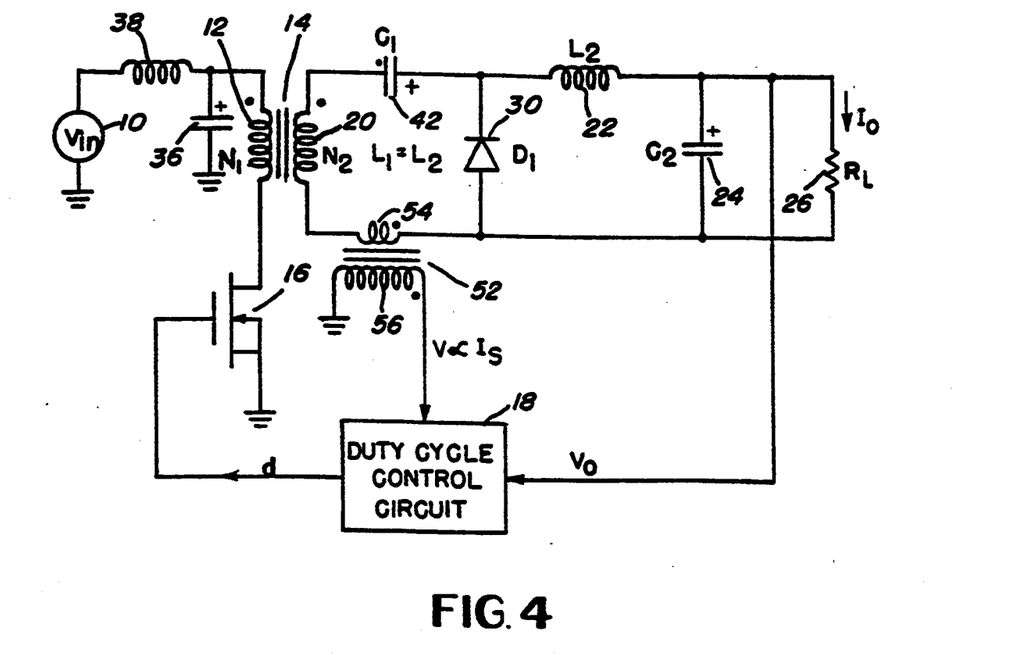
FIG. 4 is an electrical schematic diagram illustrative of an isolated or transformer version of the preferred embodiment of the invention.
Figure 5:
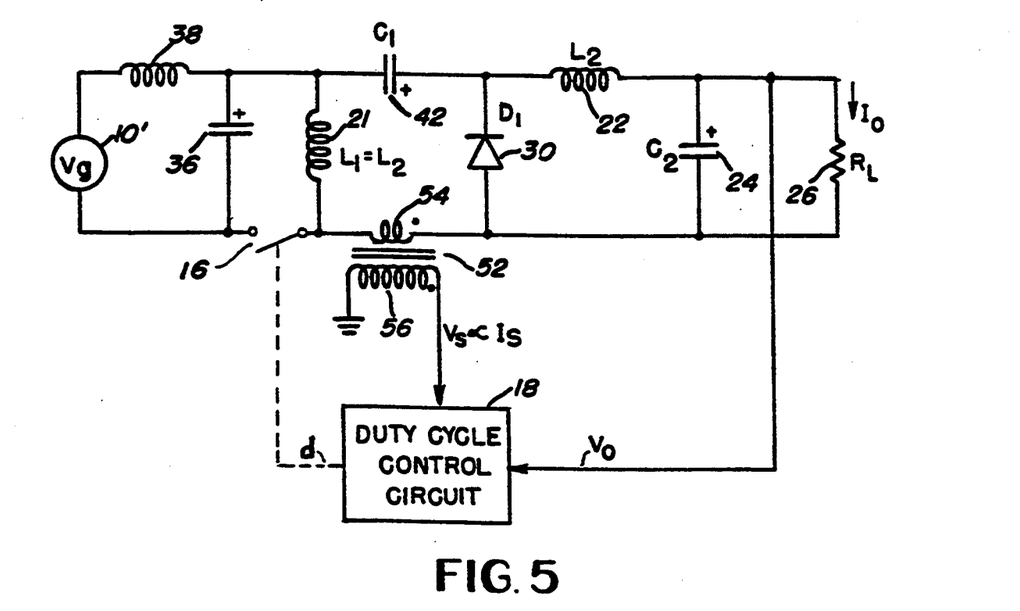
FIG. 5 is an electrical schematic diagram illustrative of a non-isolated version of the preferred embodiment of the invention shown in FIG. 4.

Considering now the preferred embodiments of the subject invention which are shown in FIGS. 4 and 5, this invention overcomes the inherent deficiencies of the prior art converter topologies shown in FIGS. 1–3 by combining the characteristics of both the forward and flyback topologies shown in FIGS. 1 and 2, while resembling the topology of the CUK topology of FIG. 3. However, subtle differences are now present in the subject invention which at first may not appear apparent but nevertheless are present and necessary for achieving an improved operation.

The subject invention does not utilize a capacitively coupled primary winding of the power transformer 14, but instead now employs a driving arrangement similar to that of a forward topology wherein energy is delivered to the output filter and transformer inductance or an equivalent inductor 21 (FIG. 5) thereof during the on-time ($dT_s$) of the switching transistor 16. The inductor 21 in effect comprises the transformer primary winding 12 reflected to the secondary side by the transformer turns ratio $N_1:N_2$.

The energy which is stored in the inductance $L_1$ of the transformer 14 or the inductor 21, however, is not dumped back to the input side, but instead is released to the secondary coupling capacitor ($C_1$) 42 during the off-time ($\bar{d}T_s$) of the transistor 16 and which is similar to the operation of a flyback topology. The topology of the subject invention is therefore termed a "forback" topology converter since it exhibits behavior of both the forward and flyback topologies alternately with $dT_s$ and $\bar{d}T_s$ of the transistor switching period $T_s$.

A current sensing transformer 52 is connected in the secondary circuit as shown in FIGS. 4 and 5 to sense the current $I_s$ flowing in the secondary circuit for controlling the duty cycle (d) of the switching transistor 16 in conjunction with the output voltage $V_o$ across the load 26. The current sensing transformer 52 includes a primary winding 54 directly connected to the end of secondary winding 20 or inductor 21 opposite from the end which is directly connected to the capacitor ($C_1$) 42 so that the inductor currents flowing in the secondary circuit during the respective time intervals of $dT_s$ and $\bar{d}T_s$ can be detected. The secondary winding 56 of the sensing transformer 52 is connected to the duty cycle control circuit 18 for providing a feedback signal voltage $V_s$ proportional to the secondary current $I_s$. The feedback control circuit 18 controls the duty cycle d of the transistor switch 16.

In addition to the specific location of the current sensing transformer 52, the methodology employed in the circuit design and hereinafter described, results in the inductance values of $L_1$ and $L_2$ being substantially equal.

These two last mentioned features result in a converter topology wherein a volt-second balance of the power transformer 14 and an amp-second balance of the current transformer 52 are achieved simultaneously. This will be more readily appreciated as the following detailed description of operation is considered.

DESCRIPTION OF OPERATION

Figure 6:
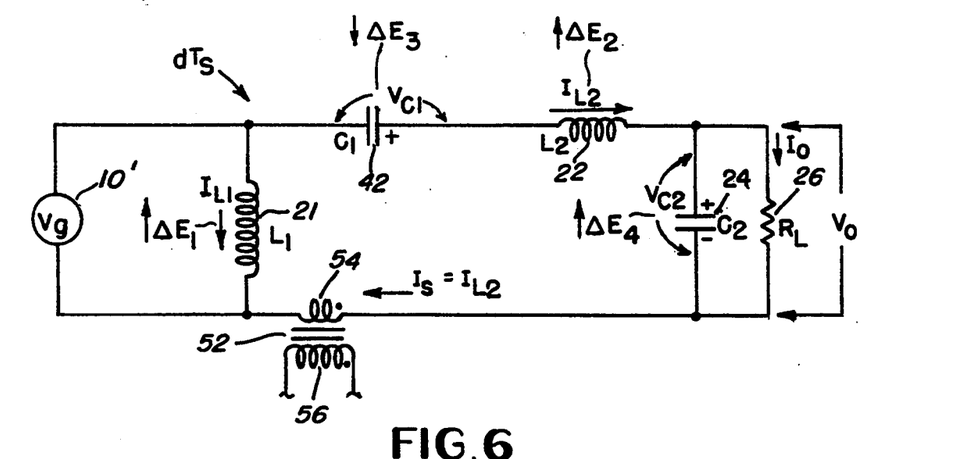
FIG. 6 is an electrical schematic diagram illustrative of the topology shown in FIG. 5 during a first portion of a circuit operating time period.
Figure 7:
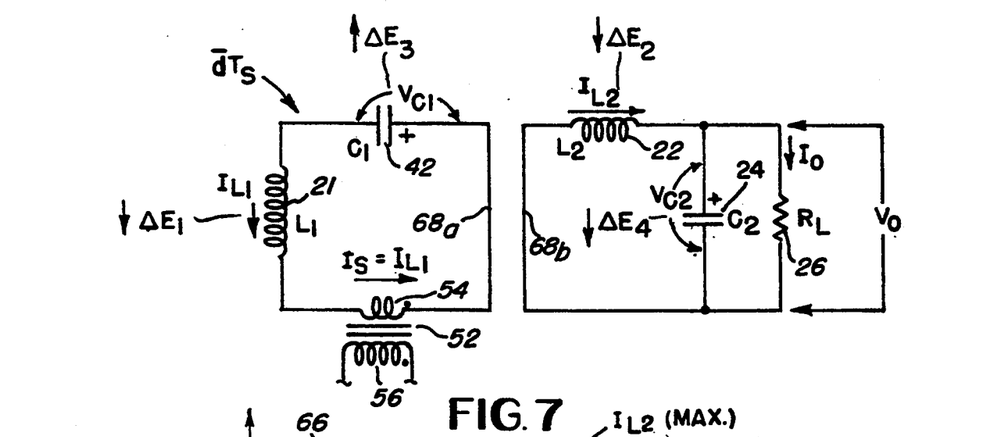
FIG. 7 is an electrical circuit diagram illustrative of the circuit shown in FIG. 5 during a second portion of the operational time period.

Referring now FIGS. 6-9, for the sake of simplicity FIG. 6 is illustrative of the equivalent circuit for the non-isolated converter topology shown in FIG. 5 during the on-time interval $dT_s$ where the transistor switch 16 is conductive. FIG. 7, on the other hand, is the equivalent circuit for FIG. 5 during the off-time interval $\bar{d}T_s$ where the switch 16 is non-conductive.

The following operational conditions exist:

$$V_g = (N_2/N_1) \times V_{in} \tag{1}$$

-continued
$$V_o = V_{C1} = V_{C2} = (d/\bar{d}) \times V_g \tag{2}$$
$$= (d/\bar{d}) \times (N_2/N_1) \times V_{in}$$

$$I_{L2}(avg) = I_o = V_{C2}/R_L \tag{3}$$
$$= (d/\bar{d}) \times (N_2/N_1) \times (V_{in}/R_L)$$

$$I_{L2}(peak) = I_o + (V_o + \bar{d} \times T_s)/2L_2 \tag{4}$$

$$I_{L1}(avg) = (d/\bar{d}) \times I_{L2}(avg) \tag{5}$$
$$= (d/\bar{d})^2 \times (N_2/N_1) \times (V_{in}/R_L)$$

and $$I_{L1}(peak) = (I_o/\bar{d}) - I_o + (V_o + \bar{d} \times T_s)/2L_1 \tag{6}$$

It can be seen with reference to FIG. 6 that during the on-time interval $dT_s$, wherein the semiconductor switch 16 is closed, the diode ($D_1$) 40, becomes reverse biased and is therefore considered an open circuit resulting in the equivalent circuit as shown. During this time, energy flows from $V_g$ i.e. source 10' to inductor ($L_1$) 21, inductor ($L_2$) 22, and capacitor ($C_2$) 24 and from capacitor ($C_1$) 42 to load resistor ($R_L$) 26.

Two currents flow during the $dT_s$ interval, namely, $I_{L1}$ and $I_{L2}$. The energy ($E_{L1}$) stored in the inductance ($L_1$) 21 increases from a minimum value to a maximum value according to the expressions:

$$E_{L1}(min) = \tfrac{1}{2}L_1 \times I_{L1}^2(min) \tag{7}$$

and, $$E_{L1}(max) = \tfrac{1}{2}L_1 \times I_{L1}^2(max) \tag{8}$$

whereupon an increase in energy, $\Delta E_1$, stored in inductor ($L_1$) 21 which can be expressed as:

$$\uparrow \Delta E_1 = \tfrac{1}{2}L_1 \times [I_{L1}^2(max) - I_{L1}^2(min)] \tag{9}$$

Figure 8:
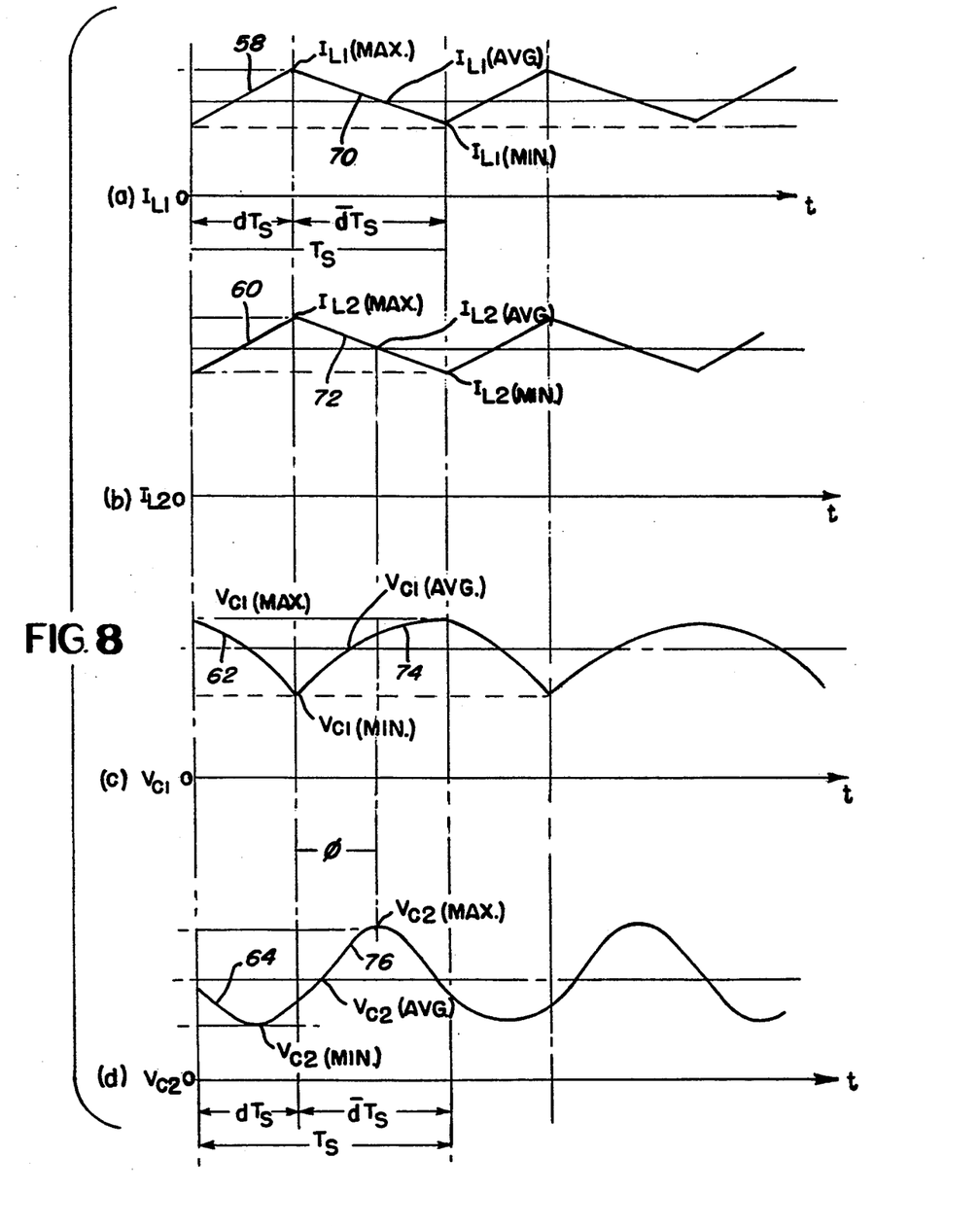
FIG. 8 is a set of time related waveforms illustrative of the current and voltage relationships provided by the non-isolated embodiment shown in FIG. 5.

Accordingly, the current in inductor ($L_1$) 21 increases linearly from a minimum value to a maximum value as shown in FIG. 8(a) by reference numeral 58.

The voltage applied to inductor ($L_2$) 22 is equal to $V_g + V_{C1} - V_{C2}$ or simply $V_g$ whereupon the stored energy increases from a minimum value to a maximum value according to the expressions:

$$E_{L2}(min) = \tfrac{1}{2}L_2 \times I_{L2}^2(min) \tag{10}$$

and $$E_{L2}(max) = \tfrac{1}{2}L_2 \times I_{L2}^2(max) \tag{11}$$

causing an increase in energy, $\Delta E_2$, which can be expressed as:

$$\uparrow E_2 = \tfrac{1}{2}L_2 \times [I_{L2}^2(max) - I_{L2}^2(min)] \tag{12}$$

As a consequence, the current $I_{L2}$ in the inductor 22 increases linearly from a minimum value to a maximum value as shown by reference numeral 60 in FIG. 8(b).

With respect to the capacitor currents flowing during $dT_s$, the current out of capacitor ($C_1$) 42 is equal to $I_{L2}$ and decreases from a maximum value to a minimum value as shown by reference numeral 62 of FIG. 8(c) and is 180° out of phase with $I_{L2}$ of FIG. 8(b). The energy stored in capacitor ($C_1$) 42 also decreases from a maximum value to a minimum value according to the expressions:

$$E_{C1}(max) = \tfrac{1}{2} C_1 \times V_{C1}^2(max) \quad (13)$$

and $$E_{C1}(min) = \tfrac{1}{2} C_1 \times V_{C1}^2(min) \quad (14)$$

whereupon the energy change, $\Delta E_3$, stored in capacitor ($C_1$) 42 can be expressed as:

$$\uparrow E_3 = \tfrac{1}{2} C_1 \times [V_{C1}^2(max) - V_{C1}^2(min)] \quad (15)$$

The current entering the + terminal of capacitor ($C_2$) 24 is $I_{L2} - I_o$. An energy change, $\Delta E_4$, which can be expressed as:

$$\uparrow E_4 = \tfrac{1}{2} C_2 [V_{C2}^2(max) - V_{C2}^2(min)] \quad (16)$$

$V_{C2}$ appears as the sinusoidal curve portion 64 shown in FIG. 8(d) and changes from a minimum value to a maximum value as shown but is out of phase with $I_{L1}$ and $I_{L2}$ by an angle $\phi$ which is determined by the relative values of $L_2$, $C_2$ and $R_L$.

Figure 9:
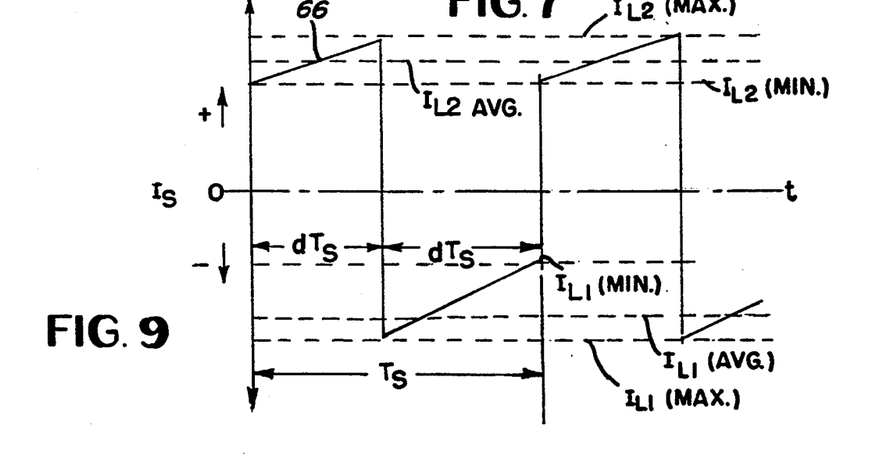
FIG. 9 is a waveform diagram illustrative of the current flow through the current sensing transformer shown in FIG. 5 during both portions and of the operational time period.

As a result of these interrelationships, the current $I_s$ flowing through the primary winding 54 of the current sense transformer 52, is equal to $I_{L2}$ and appears identical to the linear curve portion 60 of FIG. 8(b) as shown in FIG. 9 by reference numeral 66.

Turning attention now to the off-time interval $\overline{d}T_s$, when the transistor switch 16 is non-conductive, the diode ($D_1$) 30 in FIG. 5 becomes forward biased and can be considered a short circuit, resulting in an equivalent circuit as shown in FIG. 7. While two loops are shown, it is done for purposes of illustration only, since the two conductors $68_a$ and $68_b$ shown thereat are in actuality a single current conducting path.

During the $\overline{d}T_s$ interval, energy flows from the inductor ($L_1$) 21 to the capacitor ($C_1$) 42. Simultaneously, energy is delivered to the load resistance ($R_L$) 26 from the inductor ($L_2$) 22 and the capacitor ($C_2$) 24. The current $I_{L1}$ in the inductor ($L_1$) 21 decreases linearly from a maximum value to a minimum value as shown by reference numeral 70 in FIG. 8(a). This results in a decrease in energy, $\Delta E_1$, stored in inductor 21 ($L_1$) which can be expressed as:

$$\downarrow \Delta E_1 = E_{L1}(max) - E_{L1}(min) \quad (17)$$
$$= 1/2\, L_1 \times [I_{L1}^2(max) - I_{L1}^2(min)]$$

In a like manner, the current $I_{L2}$ in the inductor ($L_2$) 22 decreases linearly from a maximum value to a minimum value as shown by reference numeral 72 of FIG. 8(b). A decrease in energy, $\Delta E_2$, stored in inductor 22 ($L_2$) occurs which can be expressed as:

$$\downarrow \Delta E_2 = E_{L2}(max) - E_{L2}(min) \quad (18)$$
$$= 1/2\, L_2 \times [I_{L2}^2(max) - I_{L2}^2(min)]$$

The current flow into capacitor ($C_1$) 42 increases non-linearly as shown by waveform 74 of FIG. 8(c) with an increase in energy storage, $\Delta E_3$, which can be expressed as:

$$\uparrow \Delta E_3 = E_{C1}(max) - E_{C1}(min) \quad (19)$$
$$= 1/2\, C_1 \times [V_{C1}^2(max) - V_{C1}^2(min)]$$

The current flow out of capacitor ($C_2$) 24 is equal to $I_o - I_{L2}$ which produces the corresponding voltage waveform as shown in FIG. 8(d). The voltage $V_{C2}$ lags the current, $I_o - I_{L2}$, by the phase angle $\phi$ as shown by reference numeral 76 of FIG. 8(d). The corresponding change in energy storage may be expressed as:

$$\downarrow \Delta E_4 = E_{2}(max) - E_{2}(min) \quad (20)$$
$$= 1/2\, C_2 \times [V_{C2}^2(max) - V_{C2}^2(min)]$$

With respect to the current $I_s$ in the primary winding 54 of the current sensing transformer 52, it comprises a current $-I_{L1}$ as indicated by reference numeral 78 of FIG. 9.

Design Methodology

Regarding a physical implementation of the subject invention, the following method of circuit design would be followed so that among other things, but most importantly, $L_1 = L_2$. Typically, a circuit designer would establish or would be provided with a set of initial or desired operational parameters, namely: output voltage $V_o$, switching frequency $f_s$, minimal input voltage $V_{in(min)}$, nominal input voltage $V_{in(nom)}$, maximum input voltage $V_{in(max)}$, minimum output load $R_{L(min)}$, nominal output load $R_{L(nom)}$ and maximum output load $R_{L(max)}$. For purposes of explanation, it should be noted that $R_{L(min)}$, for example, stands for minimum resistance in ohms, whereas $R_{L(max)}$ stands for maximum resistance in ohms.

One would then proceed to determine the turns ratio $N_1:N_2$ of power transformer 20, including the value of the inductance $L_1$, the inductance $L_2$, the capacitance $C_1$ and the capacitance $C_2$. This would then be followed by the design of the power transformer if necessary.

The first step involved is determining an acceptable duty cycle d, given the output voltage $V_o$, the range of the three input voltages $V_{in}$ mentioned above, and by selecting the appropriate turns ratio $N_1:N_2$ for the transformer. The turns ratio $N_1:N_2$ should be selected such that the maximum duty cycle $d_{max}$ should not exceed a specified upper limit, typically 50% i.e. 0.5 $T_s$ and should typically be in the range between 20% and 40% and from which the duty cycle d can be determined from aforementioned equation (2) as:

$$d = N_1 V_o / (N_2 V_{in} + N_1 \times V_o) \quad (21)$$

From this, the average current $I_{L2(avg)}$ in the output inductor 22, and in the transformer secondary $I_{L1(avg)}$, as shown in equations (3) and (5), can be calculated from the initial parameters established and equation (21) for minimum, nominal and maximum conditions.

Noting that one of the inventive features comprises a DC-to-DC converter where the values of $L_1$ and $L_2$ are equal, the value for $L_2$, i.e. the inductance value of the inductor 22, is determined first. This is based on three considerations: (1) the filter requirements of the output filter consisting of inductance ($L_2$) 22 and capacitor ($C_2$) 24; (2) the desirability of maintaining a continuous current conduction mode in $L_2$; and (3) the allowable current variation $\Delta i$ of $I_{L2}$ in the inductance ($L_2$) 22.

As to the output filter requirements, the voltage input to the LC filter comprised of inductor 22 and capacitor 24 is basically a square wave with a magnitude of:

$$V_{filt} = (N_2/N_1) \times V_{in} + V_{C1} \tag{22}$$

The worst case scenario exists when the largest peak-to-peak output ripple voltage across the load resistance ($R_L$) 26 occurs at $V_{in(max)}$, $d_{(min)}$, and $R_{L(max)}$. Thus, $$V_{filt} = (N_2/N_1) \times V_{in(max)} + V_o \tag{23}$$

Accordingly, the attenuation in dB necessary to meet the ripple requirement is equal to:

$$20 \times \log [V_{o(ripple)}/V_{filt}] \tag{24}$$

The LC filter in this invention will have a $-40$ dB/dec slope. Knowing this and the required attenuation at the switching frequency $f_s$, the filter corner frequency $f_c$ is determined from the expression:

$$f_c = 1/(2\pi \sqrt{L_2 C_2}) \tag{25}$$

Rearranging equation (24) yields:

$$L_2 = 1/[(2\pi f_c)^2 \times C_2] \tag{26}$$

Selection of a few trial values for $C_2$ is now made to allow one to determine one or more candidate values for $L_2$ which will satisfy the output filter requirements of equation (25). However, the actual value of $L_2$ will also depend on the other two considerations of maintaining continuous conduction mode and the allowable $\Delta i$ percentage referred to above.

Since it is desirable to maintain a continuous conduction mode, then a critical minimum value of $L_2$ can be determined for which continuous conduction is maintained under the conditions of lightest load $R_{L(min)}$ and maximum input voltage $V_{in(max)}$. It can be shown that the minimum value of $L_2$ necessary to maintain continuous conduction mode under the lightest load and maximum input voltage condition exists where:

$$L_{2(min)} = [\bar{d}_{max} \times T_s \times R_{L(min)}] \div 2 \tag{27}$$

The value of the inductor ($L_2$) 22 dictates the slope of the current ramp as shown by the waveform segments 60 and 72 of FIG. 8(b). As a general rule, under a nominal input voltage $V_{in(nom)}$ and nominal output load $R_{L(nom)}$, $\Delta i$ should remain no more than 25% of $I_{L2(Avg)}$.

In solving for $L_2$, it can be shown that the voltage across inductor 22 $L_2$ can be expressed as:

$$V_{L2} = L_2 \times \Delta i / \Delta t \tag{28}$$

where $\Delta t = d_{nom} \times T_s$. Rearranging equation (28) results in $L_2$ being expressed as:

$$L_2 = (V_{L2} \times \Delta t)/\Delta i \tag{29}$$

or $$L_2 = (N_2 \times V_{in(nom)} \times d_{nom} \times T_s)/(N_1 \times 0.25 \times I_{L2}) \tag{30}$$

Accordingly, $L_2$ is selected on the basis of equations (26), equation (27) and equation (30). Having selected a value of $L_2$, the value of $L_1$ is now also determined. The appropriate value of capacitor 24 ($C_2$) is next determined from equation (26). The only component left to be selected is the value for the capacitor 42 ($C_1$).

In the determination of the capacitance value for capacitor 42 ($C_1$), the value of $C_1$ is not as critical as the value of the other components. Preferably, capacitor 24 should be a polycarbonate or polystyrene low ESR capacitor. A 1 $\mu$F polycarbonate capacitor, for example, is adequate for 100 kHz designs where load currents are less than one ampere(amp).

As a general rule under nominal input voltage $V_{in(nom)}$ and load conditions $R_{L(nom)}$, the change of voltage $\Delta v$ across $C_1$ should remain no more than 25% of $V_o$. During the on-time $dT_s$ of the transistor switch 16 where $\Delta v$ is selected to be 25% of $V_o$, $C_1$ can be calculated from the expression:

$$C_1 = (I_{L2(avg)} \times d_{nom} \times T_s)/(0.25 \times V_o) \tag{31}$$

With the values for $L_1$, $L_2$, $C_1$ and $C_2$ being selected, it now becomes necessary to calculate the peak currents in both inductors ($L_1$) 21 and ($L_2$) 22 which can be achieved by use of equations (4) and (6), supra.

A knowledge of the values of $L_1$, $I_{L1(peak)}$, $L_2$, and $I_{L2(peak)}$ now provides all the information required for an actual design of the power transformer 14 when an embodiment such as shown in FIG. 4 is desired. In designing the power transformer, the designer first selects a trial core, then determines the minimum number of turns on the secondary winding ($N_2$) 20 followed by determining the required air gap.

In selecting a trial core, one makes a selection based upon the maximum desired flux density limit ($B_m$) under the worst case operating conditions, the effective area ($A_e$), relative permeability ($\mu R$) and effective core lengths ($l_e$).

The total reluctance ($R_T$) of both the core ($R_c$) and the air gap ($R_g$) can be determined from the expression:

$$R_T = (l_c + l_g \times \mu_R)/\mu_R A_e \tag{32}$$

from which the inductance $L_1$ in milliHenries can be determined from the expression:

$$L_{1(mH)} = (4\pi/R_T) \times (N_2/1000)^2 \tag{33}$$

From equation (33) the total reluctance $R_T$ can be stated as $$R_T = (4\pi/L_{1mH}) \times (N_2/1000)^2 \tag{34}$$

It can be shown that the maximum flux density $B_m$ can be expressed as:

$$B_m = I_{L1(peak)} \times L_{1(mH)} \times 1 \times 10^5 (A_e \times N_2) \tag{35}$$

from which $N_2$ can be obtained by rearranging equation (35) as:

$$N_{2(min)} = I_{L1(peak)} \times L_{1(mH)} \times 1 \times 10^5/(A_e \times B_m) \tag{36}$$

It is to be noted that $N_2$, the secondary winding 20 on the transformer 14, is the inductance $L_1$ in the equivalent circuit shown in FIG. 5. Thus, equation 36 provides the minimum number of turns needed on the secondary winding 20 of the transformer 14 in order to keep from exceeding $B_m$ at a value of $I_{L1(peak)}$. When desirable, larger values of $N_2$ are permissible, which results in a corresponding reduction in $B_m$.

Now that both $N_2$ and $L_1$ are known, an air gap is determined such that the required relationship between these two parameters $N_2$ and $L_1$ for a given core is achieved. Keeping in mind equations (32)–(34), the combined length $l_g$ of the air gap and the length $l_c$ of the core can be expressed as:

$$l_c + l_g \times \mu_R = R_T \times \mu_R \times A_e \qquad (37)$$
$$= (4\pi \times \mu_R \times A_e)/L_1(mH) \times (N_2/1000)^2$$

At this point, the relationship between the effective length $l_e$, the length of the core $l_c$ and the length of the air gap $l_g$ must be specified according to the geometry of the core. For example, for a torroid, this can be expressed in centimeters(cm) as:

$$l_g(cm) = X/Y \qquad (38)$$

where,
$X = [4\pi \times \mu_R \times A_e \times N_2^2]/[10^5 \times L_1(mH)] - l_e$, and
$Y = \mu_R - 1$ Following the resolution of an acceptable value of $N_2$, the value of $N_1$ is known from above where the selection of $N_1:N_2$ turns ratio is selected to provide an acceptable duty cycle.

Due to the flyback characteristic of this topology, it is essential to optimize the coupling between the primary and secondary windings 12 and 20 of the transformer 14 and therefore in addition to minimizing the number of turns for both $N_1$ and $N_2$, the winding should be bifilar wound if possible.

Thus what has been shown and described is an improved topology and methodology for the implementation of a current mode control pulse-width modulated DC-to-DC converter which automatically provides simultaneous volt-second balance of the power transformer and amp-second balance of the current sensing transformer simply and expeditiously.

Having thus shown and described what is at present considered to be the preferred embodiments of the invention, it should be noted that the same has been made by way of illustration and not limitation. Accordingly, all modifications, alterations and changes coming within the spirit and scope of the invention as defined by the appended claims are herein meant to be included.

I claim:

1. A pulse-width modulated DC-to-DC power converter, comprising:
    a first inductor coupled across a source of DC power;
    a filter circuit connected between said first inductor and said source of DC power;
    a controlled switch device having a controlled duty cycle coupled to said source of DC power between said first inductor and said filter circuit and being rendered conductive and non-conductive in accordance with a control signal;
    a control circuit responsive to at least one feedback signal for generating said control signal, said control signal being applied to said switch device for controlling the duty cycle and accordingly the on and off conductive states of the switch device;
    a first capacitor having a first terminal thereof directly connected to a first terminal of said first inductor;
    a second inductor having a first terminal thereof directly connected to a second terminal of said first capacitor;
    wherein the value of electrical inductance of said first inductor is selected on the basis of and made equal to the value of electrical inductance of said second inductor;
    a current sensing transformer including a primary winding having a first terminal thereof directly connected to a second terminal of said first inductor, and a secondary winding coupled to said control circuit for applying said at least one feedback signal thereto;
    a second capacitor having a first terminal thereof directly connected to a second terminal of said second inductor and having a second terminal directly connected to a second terminal of said primary winding;
    a diode having an anode electrode directly connected to a common circuit connection between said second terminal of said first capacitor and said first terminal of said second inductor and a cathode electrode directly connected to said second terminal of said primary winding;
    a load directly connected across said first and second terminals of said second capacitor;
    said first inductor, said first capacitor, said second inductor, said second capacitor and said primary winding of said current sensing transformer being connected in a series circuit loop so as to enable said current sensing transformer to alternately sense the current flow in both said first and second inductors during the respective on and off conductive states of said switch device,
    thereby simultaneously providing a volt-second balance in said first inductor and an amp-second balance in said current sensing transformer while at the same time reducing undesired stresses on said controlled switch.

2. The DC-to-DC power converter according to claim 1 wherein said filter circuit comprises a third inductor having a first terminal connected to one terminal of said source of DC power and a second terminal connected to said first terminal of said first inductor, and a third capacitor having a first terminal commonly connected to said second terminal of said third inductor and said first terminal of said first inductor and a second terminal connected to a second terminal of said source of DC power.

3. The DC-to-DC power converter according to claim 1 wherein said first inductor comprises a secondary winding of a transformer, said transformer additionally having a primary winding connected across said DC power source.

4. The DC-to-DC power converter according to claim 1 wherein the said first inductor comprises a single inductor element.

5. The DC-to-DC power converter according to claim 4 wherein said single inductor element comprises an equivalent inductance of a transformer whose primary winding is reflected to a secondary side thereof by the primary to secondary turns ratio of the transformer.

6. The DC-to-DC power converter according to claim 1 wherein said second inductor and said second capacitor form an output filter circuit.

7. The DC-to-DC power converter according to claim 1 wherein said diode comprises a semiconductor diode.

8. The DC-to-DC power converter according to claim 1 and additionally including circuit means for coupling another feedback signal to said control circuit from said load.

9. The DC-to-DC power converter according to claim 1 wherein said at least one feedback signal comprises a signal proportional to the current flow in said first and second inductors and additionally including another feedback signal coupled to said control circuit, said another feedback signal being proportional to an output voltage appearing across said load.

10. The DC-to-DC power converter according to claim 1 wherein said controlled switch device comprises a semiconductor switch.

11. The DC-to-DC power converter according to claim 10 wherein said semiconductor switch comprises a transistor.

12. A method of converting power in a DC-to-DC power converter including, a first inductor coupled across a source of DC power, a filter circuit connected between the first inductor and the source of DC power, a controlled switch device coupled between the first inductor and the filter circuit, a feedback control circuit for controlling the duty cycle of the switch device, a first capacitor having a first terminal directly connected to a first terminal of the first inductor, the first inductor having a second terminal connected to a first terminal of a primary winding of a current sensing transformer, a second inductor having a first terminal directly connected to a second terminal of the first capacitor, a second capacitor having a first terminal directly connected to a second terminal of the second inductor and a second terminal connected to a second terminal of the primary winding of the current sensing transformer, a diode connected to a common circuit connection between the second terminal of the first capacitor and the first terminal of the second inductor and to the second terminal of the primary winding of the current sensing transformer, and comprising the steps of:

selecting the first inductor so as to be equal in value to the second inductor;

directly connecting a first terminal of the primary winding of the current sensing transformer to the second terminal of the first inductor and directly connecting a second terminal of the primary winding to the second terminal of both the second capacitor and the diode so as to alternately sense the currents flowing in the first and second inductors during both the respective on and off conductive states of said switch device, and directly connecting the anode electrode of the diode to the common circuit connection between the second terminal of the first capacitor and the first terminal of the second inductor and directly connecting the cathode electrode of the diode, to the second terminal of the primary winding of the current sensing transformer;

whereby a volt-second balance in said first inductor and an amp-second balance in said current sensing transformer are achieved simultaneously.

* * * * *